(12) United States Patent
Lorthioir et al.

(10) Patent No.: US 7,478,735 B2
(45) Date of Patent: Jan. 20, 2009

(54) SECURE REMOVABLE GRIPPING DEVICE

(75) Inventors: Christophe Lorthioir, Albens (FR); Michel Montgelard, Cran Gevrier (FR)

(73) Assignee: SEB SA, Ecully (FR)

( * ) Notice: Subject to any disclaimer, the term of this patent is extended or adjusted under 35 U.S.C. 154(b) by 397 days.

(21) Appl. No.: 10/521,476

(22) PCT Filed: Jul. 16, 2003

(86) PCT No.: PCT/FR03/02247

§ 371 (c)(1),
(2), (4) Date: Jul. 17, 2005

(87) PCT Pub. No.: WO2004/014207

PCT Pub. Date: Feb. 19, 2004

(65) Prior Publication Data

US 2006/0096996 A1 May 11, 2006

(30) Foreign Application Priority Data

Jul. 24, 2002 (FR) .................................. 02 09386

(51) Int. Cl.
B65D 25/28 (2006.01)
A47J 45/07 (2006.01)
A47J 45/10 (2006.01)

(52) U.S. Cl. .................. 220/759; 294/31.1; 294/28; 294/27.1; 220/762; 220/763

(58) Field of Classification Search .......... 220/759, 220/762–764; 294/27.1–34
See application file for complete search history.

(56) References Cited

U.S. PATENT DOCUMENTS

| 1,406,826 | A | * | 2/1922 | Dugger | 220/759 |
|---|---|---|---|---|---|
| 1,901,729 | A | | 3/1933 | Brewer | |
| 2,712,151 | A | * | 7/1955 | Becht | 220/759 |
| 2,808,284 | A | | 10/1957 | Rasmussen | |
| 3,065,016 | A | * | 11/1962 | Serio | 294/31.1 |
| 3,065,017 | A | * | 11/1962 | Serio | 294/31.1 |
| 3,065,018 | A | * | 11/1962 | Serio | 294/31.1 |
| 3,108,316 | A | * | 10/1963 | Peale | 220/759 |
| 3,157,909 | A | * | 11/1964 | Schmitt | 220/759 |
| 3,186,026 | A | * | 6/1965 | Serio | 220/759 |
| 3,306,648 | A | * | 2/1967 | Serio | 294/27.1 |
| 3,438,082 | A | * | 4/1969 | Jones et al. | 220/759 |
| 3,474,486 | A | * | 10/1969 | Serio et al. | 220/759 |
| 4,512,495 | A | * | 4/1985 | Bauer et al. | 220/316 |
| 4,577,367 | A | * | 3/1986 | Durand | 220/759 |

(Continued)

FOREIGN PATENT DOCUMENTS

FR    2 739 772    4/1997

(Continued)

*Primary Examiner*—Anthony D Stashick
*Assistant Examiner*—Ned A Walker
(74) *Attorney, Agent, or Firm*—Bachman & LaPointe, P.C.

(57) ABSTRACT

A removable gripping device for a container has two clamp-forming elements which are mounted to a gripping body, one of which can move longitudinally between an open position and a closed position; and movement elements which are designed to move the mobile element. According to the invention, the device also has locking devices which can move between an active position and a locking position in which they prevent the lever from rotating and moving from the retracted position to the deployed position thereof.

16 Claims, 2 Drawing Sheets

U.S. PATENT DOCUMENTS

| | | | | |
|---|---|---|---|---|
| 5,704,092 A | * | 1/1998 | Nicollet et al. | 16/425 |
| 6,000,100 A | * | 12/1999 | Montgelard | 16/425 |
| 6,257,439 B1 | * | 7/2001 | Hsu | 220/759 |
| 6,318,776 B1 | * | 11/2001 | Lee | 294/34 |
| 6,393,973 B1 | * | 5/2002 | Velo et al. | 99/422 |
| 6,439,420 B1 | * | 8/2002 | Park | 220/759 |
| 6,708,373 B2 | * | 3/2004 | Dodane | 16/425 |

FOREIGN PATENT DOCUMENTS

| | | |
|---|---|---|
| FR | 2 768 914 | 4/1999 |
| JP | 2002017581 | 1/2002 |
| JP | 2002034804 | 2/2002 |

* cited by examiner

SECURE REMOVABLE GRIPPING DEVICE

BACKGROUND OF THE INVENTION

This invention relates to a removable gripping device for a container, particularly a secure removable handle for a pot or a pan.

A removable gripping device for a container of the type comprising two members forming a gripper mounted on a gripping body is known, in which one of the members forming the gripper is free to move in translation with respect to the gripping body, along a direction approximately parallel to the longitudinal direction of the gripping body between an open position and a closed position in which the members forming a gripper are adapted to grip an edge of the container, the removable gripping device comprising displacement means adapted to displacing members forming the gripper with respect to each other, said displacement means comprising a lever free to move in rotation with respect to the gripping body between an extended position and a retracted position in which the mobile member forming a gripper is in the closed position, and a transmission means extending between the lever and the mobile member forming a gripper adapted to displacing the mobile member forming a gripper in translation when the lever is pivoted, said displacement means being shaped such that the lever 7 is in a stable equilibrium position when it is in the extended position and when it is in the retracted position, and it passes through an intermediate unstable equilibrium position when it passes from one of these two stable equilibrium positions to the other.

Such removable gripping devices are described in patent applications FR 2 739 772 and FR 2 768 914.

In these known prior devices, when a sudden manipulation of a removable gripping device takes place, the devices forming a gripper may accidentally change from their closed position to their open position particularly if, when the members forming the gripper are in the closed position, the displacement means are close to the equilibrium position from which the members forming the gripper are brought towards their open position when the members forming the gripper are in the closed position, which means that there is a risk that the user would spill the contents of the container, possibly causing scalding.

U.S. Pat. No. 6,318,776 also describes a gripping device of the type mentioned above comprising locking means separate from the displacement means, free to move between an active position and a locked position in which they prevent the lever from accidentally rotating to its unstable equilibrium position. According to this document, the locking means are formed by a ball mounted free to slide on the gripping body and adapted so that it is partially housed in a cavity formed on the lever when the lever is in a closed position. Every time that the lever is deliberately pivoted in one direction or the other, the shape of the cavity and the force of the spring connecting the ball to the gripping body enable the ball to slide so that the ball moves into its active position. Obviously, these locking means are not capable of preventing the lever from opening in all cases, beyond a certain force applied to the lever.

Therefore the problem that arises is to make a removable gripping device according to which the members forming a gripper cannot accidentally move from their closed position to their open position, even under circumstances mentioned above, and are thus safer to use.

SUMMARY OF THE INVENTION

The solution proposed to this problem is a gripping device of the type mentioned above, for which the locking means are adapted to prevent any pivoting of the lever as far as its unstable equilibrium position and including an activation button adapted to be maneuvered manually to enable the locking means to move into their active position in which the lever can change from its retracted position to its extended position.

In this way, locking the lever in its retracted position prevents the members forming a gripper from opening, even if the user manipulates the gripping device sharply.

According to one particular embodiment, the locking means are closer to the members forming a gripper when they are in the active position than when they are in the locked position.

With this arrangement, the user releases the locking means by moving the locking means away from the members forming the gripper. This maneuver is less natural than bringing the means of locking the members forming a gripper closer to each other, and consequently the risks of the lever being accidentally released are very much reduced.

According to another particular embodiment, the means of locking in the active position are adapted to make the lever move from its retracted position to its extended position.

With this arrangement, the user releases the lever and then in a continuation of the same movement, moves the lever towards its extended position and the members forming the gripper towards their open position. In this way, the user can manipulate the locking means and extend the lever without needing to alter his or her grip.

According to another particular embodiment, the gripping device comprises a shaft about which the lever and transmission means are hinged, the shaft being located close to the end of the lever opposite the end at which the lever is connected to the gripping body, and being free to move in translation in a slit made in the transmission means close to the end of the transmission means opposite the end at which the transmission means is connected to the mobile member forming a gripper.

With this particular arrangement of displacement means, the gripping device can dependably grip the edges of the container with a thickness variable within a relatively large range of between 0.5 and 3.5 mm (corresponding approximately to the movement amplitude of the shaft in the slit).

According to another embodiment, the lever and the transmission means are short, so that the user always has space to hold the gripping body with his ring finger and his little finger, only the index and the middle finger being located at the lever, and so that it reduces the movement amplitude of the lever.

According to another particular arrangement, a coil spring housed in the transmission means is used as an elastic means of the toggle joint mechanism. Consequently, unlike gripping devices according to prior art comprising a leaf spring forming a connecting rod, there is no risk of damage when the edge of the gripped container is thick.

The small moving amplitude of the lever means that the lever and the transmission means may have vertical walls arranged such that even when the lever is in the extended position, the entire mechanism is concealed and protected from any dirt accumulation.

Other special features of the invention will become clearer after reading the following detailed description.

BRIEF DESCRIPTION OF THE DRAWINGS

In the appended drawings given as a non-limitative example.

DETAILED DESCRIPTION OF THE PREFERRED EMBODIMENT(S)

Figure 1:
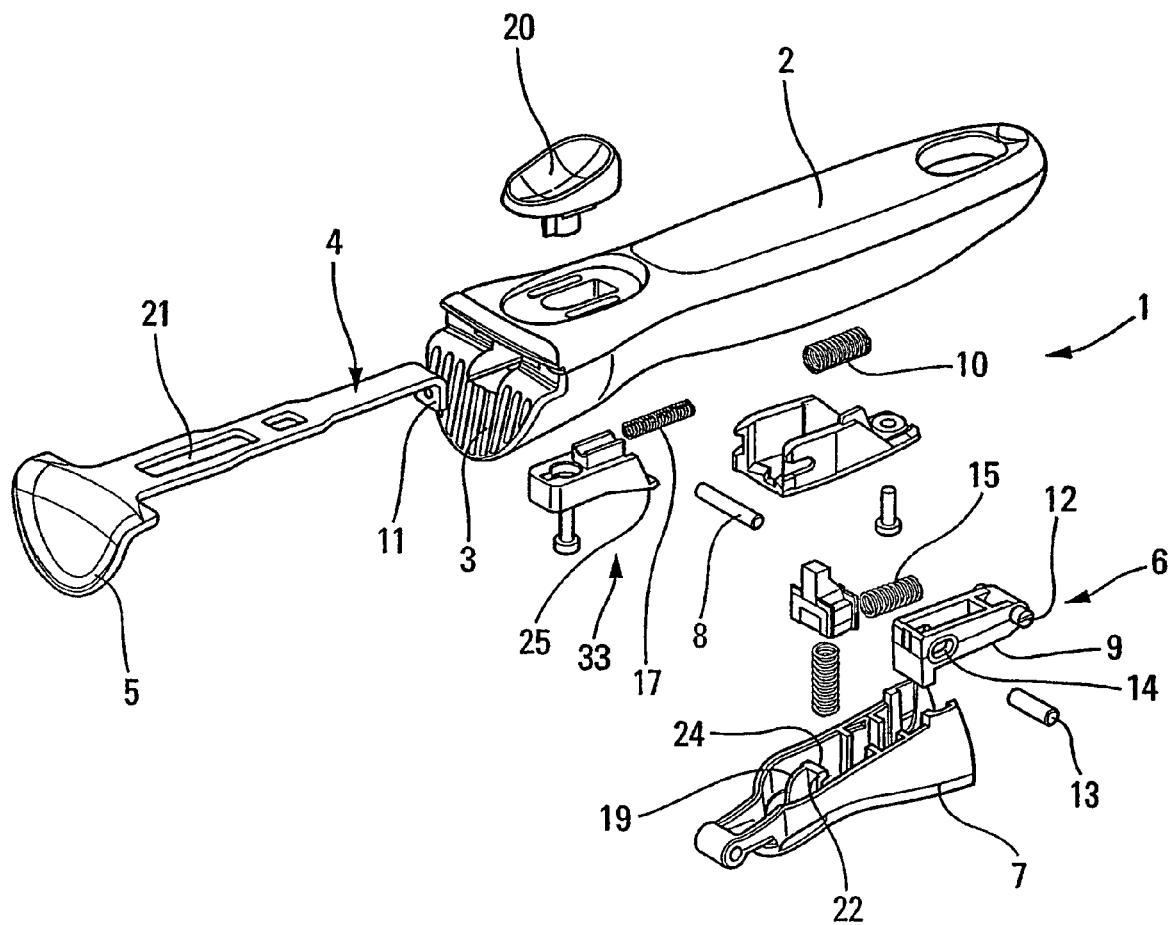
FIG. 1 is an exploded perspective view of a removable gripping device according to this invention.

As can be seen in FIG. 1, a removable gripping device 1 for a container (for example a removable handle for a pan) comprises a gripping body 2 on which two members forming a gripper 3, 4 are formed.

Figure 2:
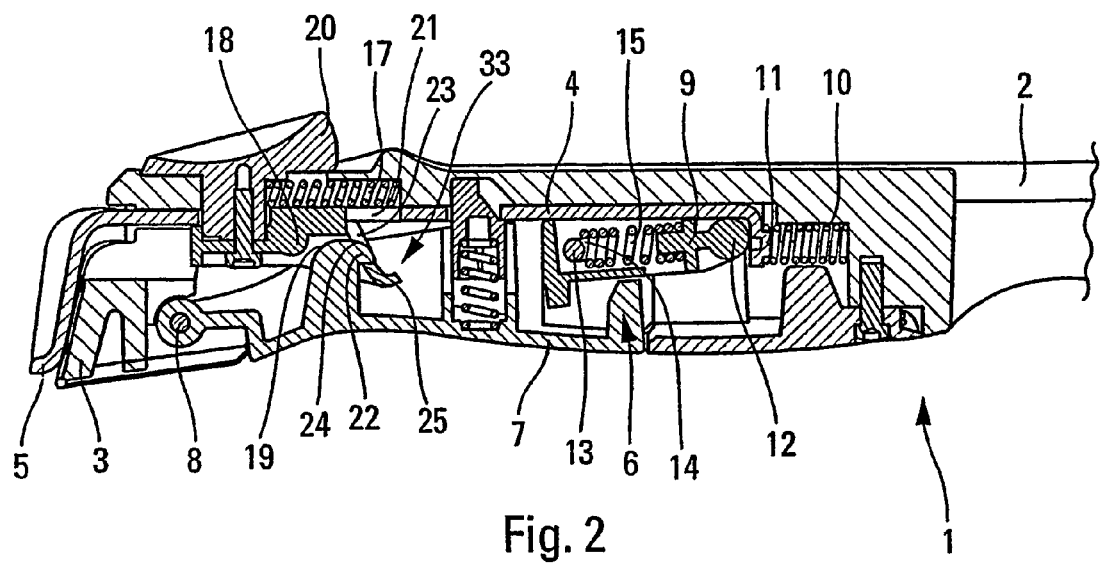
FIG. 2 shows a longitudinal sectional view of a removable gripping device, with the members forming the gripper in the closed position.

A first member forming a gripper 3 is fixed to one end of the gripping body 2, and the second member forming a gripper 4 is installed free to move in translation with respect to the gripping body 2, between an open position (FIG. 3) and a closed position (FIG. 2).

The mobile member forming a gripper 4 comprises a gripping end 5 which is adapted to cooperate with the fixed member forming a gripper 3, to grip an edge of the container when the mobile member forming a gripper 4 is in the closed position.

In this embodiment, the fixed member forming a gripper 3 and the gripping end 5 of the mobile member forming a gripper 4 are shaped so as to be able to grip containers for which the upper end of the edge is curved outwards and thus forms a short curved collar.

An opening spring 10 bears in contact with the gripping body 2 and a bearing end 11 of the mobile device forming a gripper 4 opposite the gripping end 5, and permanently tends to move the mobile member forming the gripper 4 towards its open position.

The removable gripping device 1 comprises displacement means 6 that are adapted to move the mobile device forming a gripper 4 with respect to the gripping body 2.

These displacement means 6 comprise a lever 7 installed free to move in rotation about a rotation axis 8 with respect to the gripping body 2 between an extended position (FIG. 3) and a retracted position (FIG. 2). The rotation axis 8 is normal to the longitudinal direction of the gripping body 2 and is located close to the fixed member forming the gripper 3 and close to a first end of the lever 7.

In this example, when the lever 7 is in its retracted position, it is completely within the gripping body 2 so that the user cannot manipulate it.

When the lever 7 is in the extended position, the mobile member forming a gripper 4 is in the open position, and when it is in the retracted position, the mobile member forming a gripper 4 is in the closed position.

The displacement means 6 also include a transmission means 9 that extends between the lever 7 and the mobile member forming a gripper 4 and that is adapted to moving the mobile member forming a gripper 4 in translation when the lever 7 is pivoted.

Figure 3:
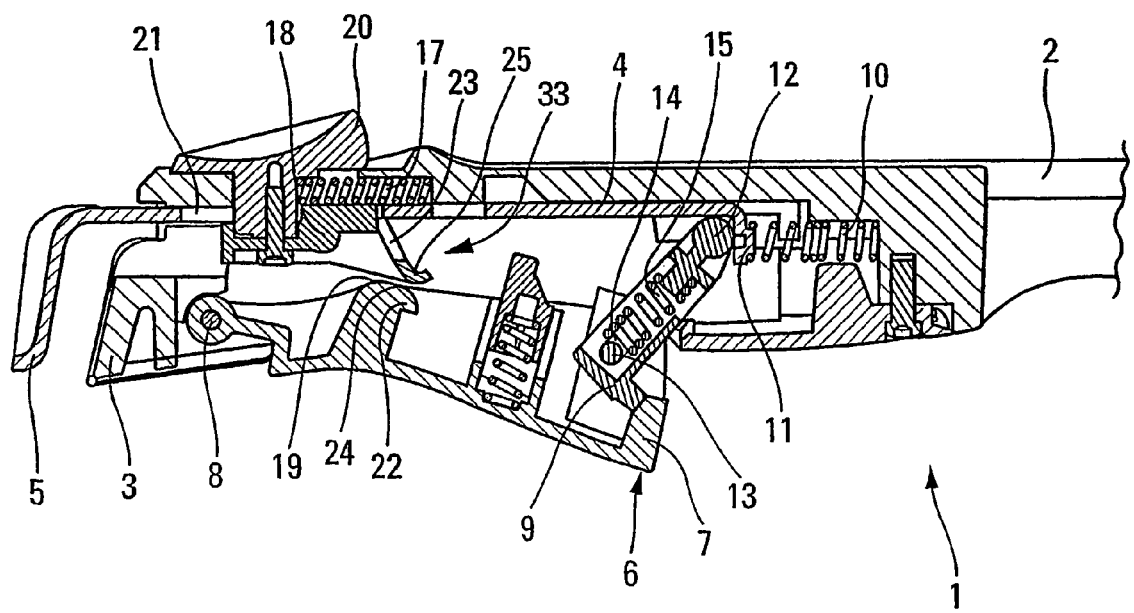
FIG. 3 is a longitudinal sectional view of a removable gripping device, the members forming the gripper being in the open position.

In the example illustrated in FIGS. 1 to 3, the transmission means 9 is a connecting rod 9 and the displacement means 6 are arranged as a toggle joint: the displacement means 6 are shaped such that the lever 7 is in a stable equilibrium position when it is in the extended position and when it is in the retracted position, and it passes through an unstable equilibrium position (defined by the equilibrium line of the displacement means 6) when it passes from one of these two stable equilibrium positions to the other.

Compared with the mobile member forming a gripper 4, the connecting rod 9 is free to rotate about a pivot axis 12 adjacent to the bearing end 11 of the mobile member forming a gripper 4 and adjacent to a first end of the connecting rod 9.

The connecting rod 9 is free to move in rotation with respect to the lever 7, about a shaft 13. The shaft 13 is free to move in translation in a slit 14 made in the connecting rod 9 and that extends in the longitudinal direction of the connecting rod, in order to maintain the relation as a toggle joint. The shaft 13 is free to move between an unstable equilibrium position in which the shaft 13 is located on the equilibrium line of the toggle joint mechanism defined by the rotation axis 8 and the pivot axis 12 and a stable equilibrium position in which the lever 7 is either in its extended position (the shaft 13 being on the so-called open side of the equilibrium line), or in its retracted position (the shaft 13 being located on the so-called closed side of the equilibrium line).

A toggle joint spring 15 permanently tends to move the shaft 13 towards its stable equilibrium position.

When the shaft 13 is located on the open side of the equilibrium line, the opening spring 10 firstly tends to move the mobile member forming a gripper 4 towards its open position, and secondly to move the lever 7 towards its extended position through the connecting rod 9.

When the shaft 13 is located on the closed side of the equilibrium line, the opening spring 10 tends to move the lever 7 towards its retracted position, and firstly forces the lever 7 into contact with the gripping body 2, and secondly forces the connecting rod 9 into contact with the mobile member forming a gripper 4, the toggle joint spring 15 being oriented along a direction very close to the direction of the opening spring 10. Consequently, the toggle joint spring 15 that tends to move the shaft 13 towards its equilibrium position, imposes a translation on the mobile member forming the gripper 4 towards its closed position, despite the presence of the opening spring 10.

When a user wants to grip the edge of a container, he or she positions the edge between the fixed member forming a gripper 3 and the gripping end 5 of the mobile member forming the gripper 4 in the open position, and makes the lever 7 pivot from its extended position into its retracted position. Rotation of the lever 7 causes rotation of the connecting rod 9 and translation of the mobile member forming a gripper 4, the shaft 13 then crossing the equilibrium line of the toggle joint mechanism, so as to obtain a stable grip of the edge of the container.

The free movement of the shaft 13 in the slit 14 enables adjustment of the distance between the gripping end 5 of the mobile member forming a gripper 4 in the closed position and the fixed member forming a gripper 3 to match the thickness of the edge of the container.

The range of distances separating the gripping end of the mobile member forming a gripper 4 in the closed position and the fixed member forming a gripper 3 is significantly less than the movement amplitude of the shaft 13 in the slit 14 so that the shaft 13 can pass the equilibrium line to achieve a stable grip.

According to the embodiment illustrated in FIGS. 1 to 3, the shaft 13 is located close to the second end of the lever 7 opposite the first end close to the rotation axis 8. The slit 14 is made close to the second end of the connecting rod 9 opposite the first end close to the pivot axis 12, the shaft 13 being acted upon by the toggle joint spring 15 tending to move it towards the longitudinal end of the slit 14 that is closest to the second end of the connecting rod 9.

Due to this particular arrangement of displacement means 6, the gripping device 1 can reliably grip edges of containers, for which the thickness can vary within a relatively large range (between 0.5 and 3.5 mm).

Moreover, the use of a coil spring inside the connecting rod 9 acting as a toggle joint spring 15 eliminates any risk of the quick fastener mechanism being damaged, although the range of container edge thicknesses that can be gripped is large.

Furthermore, in order to facilitate gripping of the gripping device 1, even when the lever 7 is in the extended position, the length of the lever 7 is shorter such that a user holding the gripping device 1 will have his or her index finger and middle finger in contact with the lever 7, and the ring finger and little finger in contact with the gripping body. Consequently, the user can release the lever 7 from the gripping area consisting of the index finger and the middle finger, while keeping the ring finger and the little finger in position to hold the gripping body 2. Typically, the length of the lever corresponds to the width of three fingers in contact with each other (or about 7 cm from the rotation axis 8, or about 6 cm for the part of the lever pivoting outside the gripping body 2).

Furthermore, the use of a shorter connecting rod 9 can give a lever 7 with small movement amplitude, making it easier to hold the gripping device 1, even when the lever 7 is in the extended position.

Thus, the user does not need to change his or her grasp when the lever 7 is moved from the extended position to the retracted position, and vice versa.

Advantageously, the lever 7 and the connecting rod 9 include vertical walls arranged such that even when the lever 7 is in the extended position, the mechanism assembly is concealed and protected from any dirt accumulation.

The removable gripping device 1 comprises actuation means capable of enabling extension of the lever 7.

The removable gripping device 1 comprises locking means 33, separate from the displacement means 6, and free to move between an active position and a rest position called the locked position, in which the locking means 33 are adapted to prevent rotation of the lever 7 from its retracted position to its extended position.

When they are in the active position, the locking means 33 are adapted to enable the lever 7 to move from one of its two stable positions to the other, particularly when the user wants to grip or release a container, and when they are in the locking position, the locking means 33 are adapted to lock the lever 7 in its retracted stable position preventing any rotation movement and preventing any crossing over its unstable equilibrium point.

In the example illustrated in FIGS. 1 to 3, the locking means 33 are mounted free to move in translation on the gripping body 2 along a direction approximately parallel to the direction longitudinal to the gripping body 2.

The locking means 33 are forced towards their locking position by any return means such as a locking spring 17 bearing in contact with the gripping body 2 and the locking means 33.

As can be seen in FIGS. 1 and 2, the lever 7 comprises a hook 22, and the locking means 33 comprise a tab 25 in which an opening 23 is formed, in which the hook 22 is engaged when the lever 7 is in its retracted position and the locking means 33 are in the locked position.

The hook 22 is engaged in the opening 23 by click fitting: when the lever 7 is pivoted from its extended position towards its retracted position, an upper surface 24 of the hook 22 stops in contact with the tab 25 and the locking means 33 are entrained in translation towards their active position as far as a click fit position in which the hook 22 is at the opening 23. In this click fit position, the locking spring 17 moves the locking means 33 in translation towards their locking position, thus forming the click fitting.

Therefore, the locking means 33 lock the lever 7 in its retracted position. This arrangement prevents any accidental opening due to a sudden manipulation of the removable gripping device 1 that could make the shaft 13 cross over the equilibrium line due to jerk.

In the example shown in FIGS. 1 to 3, the locking means 33 are closer to the members forming the gripper 3, 4 when they are in the locked position than when they are in the active position. The hook 22 is along the direction opposite to the rotation axis 8. The tab 25 is located at the height of the hook 22 when the lever 7 is locked, and it is inclined such that the face facing the rotation axis 8 forms an obtuse angle with the longitudinal direction of the gripping body 2.

Furthermore, the locking means 33 comprise an activation button 20 that can be manipulated by the user and that projects from the surface of the removable gripping device 1 on the side opposite the side to which the lever 7 is fixed. The mobile device forming the gripper 4 has a groove 21 through which the activation button 20 is solidarized to the tab 25 (the activation button 20 and the tab 25 are located on each side of the mobile member forming a gripper 4) such that the movement of the mobile member forming a gripper 4 is not hindered by the locking means 33 and vice versa.

When the user wants to move the lever 7 from its retracted position to its extended position so as to release the container from the members forming the gripper 3, 4, he or she imposes a translation on the locking means 33 using the activation button 20, to make them translate towards their active position. As soon as the locking means 33 are in the click fit position, the hook 22 is no longer engaged in the opening 23 and the lever 7 can be pivoted towards its extended position by the actuation means.

With the activation button 20, the user unlocks the lever 7 without needing to alter his or her grip, particularly using the thumb. Furthermore, since the locking means 33 are closer to the members forming the gripper 3, 4 when they are in the locking position than when they are in the active position, the user unlocks the lever 7 by pulling the control button 20 towards himself or herself, rather than by pushing it towards the container, which prevents any accidental release of the control button.

Furthermore, in the example illustrated in FIGS. 1 to 3, the locking means 33 in the active position are adapted to make the lever 7 move from its retracted position to its extended position. Consequently, the locking means 33 also behave like actuation means.

As can be seen in FIGS. 2 and 3, the lever 7 comprises a bearing surface 19, and the locking means 33 comprise an element forming an inclined plane 18 adapted to stop in contact with the bearing surface 19 when the lever 7 is in the retracted position, and the locking means 33 are in the active position.

The inclined plane 18 and the bearing surface 19 are shaped such that when the locking means 33 are in the active position, the inclined plane 18 stops in contact with the bearing surface 19 and imposes a pivoting movement on the lever 7 about the rotation axis 8 towards its extended position. Pivoting of the lever 7 imposed by the inclined plane is such that the equilibrium point of the toggle joint mechanism is passed, in other words the shaft 13 passes through the equilibrium line. Once equilibrium has been crossed, the opening spring 10 tends to move the lever 7 towards its extended position and the mobile member forming the gripper 4 towards its open position.

The inclined plane 18 is arranged between the rotation axis 8 and the bearing surface 19 facing the rotation axis 8, along the longitudinal direction of the gripping body 2.

Therefore, the locking means enable the user to release the lever 7 and then to move it from its retracted position to its extended position without needing to alter his grip, using the thumb only.

In the example illustrated in FIGS. 1 to 3, the inclined plane 18 is fixed to the tab 25 and the hook 22 is fixed to the bearing surface 19. The inclined plane 18, the bearing surface 19, the hook 22 and the tab 25 are arranged such that the hook 22 is released from the opening 23 by translation of the locking means 33 towards their active position before the inclined plane 18 stops in contact with the bearing surface 19: the hook 22 is further from the rotation axis 8 than the contact surface 19.

When the user wants to move the lever 7 from its retracted position to its extended position so as to release the container from the members forming the gripper 3, 4, he or she moves the locking means 33 in translation as far as the active position, using the activation button 20. During this translation, the release means 16 cross their click fit position in which the hook 22 is no longer engaged in the opening 23. Consequently, the lever 7 is released before the inclined plane 18 stops in contact with the bearing surface 19, so that the lever 7 can pivot towards its retracted position and the mobile member forming a gripper 4 can move into its open position.

Therefore the activation button 20 enables the user to manipulate the locking means 33 and the actuation means that are composed of the locking means 33.

Obviously, this invention is not limited to the embodiment described in detail above.

It would be possible to make a removable gripping device that does not include activation means fixed to the locking means, or in which the transmission means is not a connecting rod.

It would also be possible for the displacement means not to be designed to adjust the distance separating the two members forming the gripper when in the closed position, to match the thickness of the gripped container.

It would also be possible to have a removable gripping device, comprising two members forming a gripper mounted on a gripping body, one of the members forming a gripper free to move in translation with respect to the gripping body along a direction approximately parallel to the longitudinal direction of the gripping body, between an open position and a closed position in which the members forming the gripper are adapted to grip an edge of the container, the device also comprising displacement means adapted to displacing the members forming a gripper with respect to each other, said displacement means including a lever installed free to move in rotation with respect to the gripping body between an extended position and a retracted position in which the mobile member forming a gripper is in its closed position, and a transmission means extended between the lever and the mobile member forming a gripper and adapted to move the mobile member forming the gripper in translation when the lever is pivoted, characterized in that the lever is short (as described above, in other words such that the gripping body can be grasped behind the lever by at least the little finger and the ring finger), so that there is no need to change the grip depending on whether the lever is in its extended position or in its retracted position. Preferably, the transmission means (such as the connecting rod) are hinged at the end of the lever opposite the end at which it is hinged to the gripping body. Obviously, this type of gripping device could have any particular characteristics mentioned in this application.

The invention claimed is:

1. A removable gripping device for a container, comprising:
    two members forming a gripper mounted on a gripping body in which one of the members forming the gripper is mobile and free to move in translation with respect to the gripping body along a direction approximately parallel to a longitudinal direction of the gripping body between an open position and a closed position in which the members forming the gripper are adapted to grip an edge of the container,
    displacement means for displacing the members forming the gripper with respect to each other, said displacement means comprising a lever free to move in rotation with respect to the gripping body between an extended position and a retracted position in which the mobile member forming the gripper is in a closed position, and a transmission means extending between the lever and the mobile member forming the gripper for displacing the mobile member forming the gripper in translation when the lever is pivoted, said displacement means being shaped such that the lever is in a stable equilibrium position when in the extended position and when in the retracted position, and the lever passes through an unstable equilibrium position when passing from one of these two stable equilibrium positions to the other, and
    locking means for preventing said lever from moving from said retracted position to said unstable equilibrium position, said locking means being separate from said displacement means and said mobile member, said locking means having a portion which engages said lever when said lever is in said retracted position and which disengages from said lever when said locking means is moved into an active position, thereby allowing said lever to move from said retracted position to said extended position, and an activation button for moving said locking means into said active position, said activation button being separate from said lever, and said activation button is seated on an exterior surface of the gripping body opposite a surface on which the lever is hinged.

2. A removable gripping device according to claim 1, wherein the locking means are installed in translation on the gripping body along a direction approximately parallel to the longitudinal direction of the gripping body.

3. A removable gripping device according to claim 1, wherein the locking means are closer to the members forming the gripper when the locking means are in the locked position than when the locking means are in the active position.

4. A removable gripping device according to claim 1, wherein the locking means cooperate with the lever by click fitting.

5. A removable gripping device according to claim 1, wherein the activation button projects from the exterior surface of the gripping body opposite the surface on which the lever is hinged.

6. A removable gripping device according to claim 1, wherein said removable gripping device comprises a return means pushing the locking means in a locked position in which said portion engages said lever when said lever is in said retracted position.

7. A removable gripping device according to claim 1, wherein the locking means comprise a tab in which an opening is formed, in which a hook of the lever is engaged when the locking means are in the locked position, and is released from the hook when the locking means are in the active position.

8. A removable gripping device according to claim 7, wherein the hook comprises an upper surface adapted to entrain the locking means from their active position towards a position enabling click fitting of the hook in the opening, when the lever is pivoted into the retracted position.

9. A removable gripping device according to claim 7, wherein the activation button projects from the exterior surface of the gripping body opposite the surface on which the lever is hinged and the mobile member forming the gripper has a groove through which the activation button is solidarized to the tab.

10. A removable gripping device according to claim 1, wherein the locking means and the lever are shaped such that when the locking means are displaced from the locked position to the active position they make the lever move from the retracted position to the extended position.

11. A removable gripping device according to claim 10, wherein the locking means comprise an element forming an inclined plane adapted firstly to stop in contact with a contact surface of the lever when the locking means are in the active position, and secondly to impose a pivoting movement on the lever, to move the lever from the retracted position to a position in which the lever is moved to the extended position by the transmission means alone.

12. A removable gripping device according to claim 11, wherein the locking means comprise a tab in which an opening is formed, in which a hook of the lever is engaged when the locking means are in the locked position, and is released from the hook when the locking means are in the active position, the hook being released from the opening by translation of the locking means towards the active position before the inclined plane stops in contact with the contact surface.

13. A removable gripping device according to claim 1, wherein the displacement means adjust a distance separating the two members forming the gripper in the closed position to match a thickness of the gripped container.

14. A removable gripping device according to claim 13, wherein a spring acts on the mobile member so as to enable adjustment of the distance separating the two members forming the gripper and is housed in the transmission means.

15. A removable gripping device according to claim 1, wherein the transmission means are formed by a connecting rod free to rotate with respect to the lever and to the mobile member forming the gripper.

16. A removable gripping device according to claim 15, wherein the connecting rod is free to move in rotation with respect to the lever under the control of a shaft that is located close to an end of the lever opposite an end at which the lever is hinged to the gripping body.

* * * * *